United States Patent
Hansen

(10) Patent No.: US 6,426,035 B1
(45) Date of Patent: Jul. 30, 2002

(54) PROCESS FOR PRODUCING HOLLOW PLASTIC RECEPTACLES

(76) Inventor: Bernd Hansen, Heerstrasse 16, 7166 Sulbach-Laufen 2 (DE)

( * ) Notice: Subject to any disclaimer, the term of this patent is extended or adjusted under 35 U.S.C. 154(b) by 0 days.

(21) Appl. No.: 07/637,971

(22) Filed: Jan. 9, 1991

Related U.S. Application Data

(63) Continuation of application No. 07/404,414, filed on Sep. 8, 1989, now abandoned.

(30) Foreign Application Priority Data

Sep. 21, 1988 (DE) .......................................... 38 31 957

(51) Int. Cl.⁷ .......................... B29C 49/02; B29C 51/10
(52) U.S. Cl. ........................ 264/525; 264/524; 264/527; 264/545; 156/292; 425/524; 425/525
(58) Field of Search .............................. 264/525, 524, 264/527, 545, 523, 248, 520, 536; 425/524, 525, 522; 156/292; 215/1 C, 40, 47, 49; 206/DIG. 800, 538, 534.1, 484, 484.2, DIG. 34; 53/453

(56) References Cited

U.S. PATENT DOCUMENTS

| | | | | |
|---|---|---|---|---|
| 1,654,647 A | * | 1/1928 | Heist | 156/292 |
| 2,918,698 A | * | 12/1959 | Hagen et al. | 264/527 |
| 2,991,500 A | * | 7/1961 | Hagen | 264/524 |
| 3,206,908 A | * | 9/1965 | Bodet | 206/484 |
| 3,300,556 A | * | 1/1967 | Battenfeld et al. | 425/525 |
| 3,325,860 A | * | 6/1967 | Hansen | 264/524 |
| 3,339,232 A | * | 9/1967 | Battenfeld et al. | 425/525 |
| RE27,155 E | * | 7/1971 | Hansen | 425/524 |
| 3,597,793 A | * | 8/1971 | Weiler | 425/317 |
| 3,935,358 A | * | 1/1976 | Wyeth et al. | 264/248 |
| 4,502,616 A | * | 3/1985 | Meierhoefer | 206/820 |
| 4,512,475 A | * | 4/1985 | Federighi | 206/484 |
| 4,592,718 A | * | 6/1986 | Teraoka | 264/524 |

FOREIGN PATENT DOCUMENTS

| | | | | |
|---|---|---|---|---|
| DE | 2636262 | * | 2/1978 | 264/520 |
| FR | 1134426 | | 4/1957 | |
| GB | 1358957 | * | 7/1974 | 206/484 |
| GB | 1465564 | | 2/1977 | |
| GB | 1487440 | | 9/1977 | |

\* cited by examiner

Primary Examiner—Jan H. Silbaugh
(74) Attorney, Agent, or Firm—Roylance, Abrams, Berdo & Goodman, L.L.P.

(57) ABSTRACT

In the production of hollow plastic receptacles from two areas of a strip of starting material, all of each receptacle can be formed from the strip, or half of each receptacle can be formed from the strip with the halves welded together to complete the receptacles. Outside of part of at least one of the fusion seams, a marginal piece of waste segment forms at least one hollow body.

30 Claims, 3 Drawing Sheets

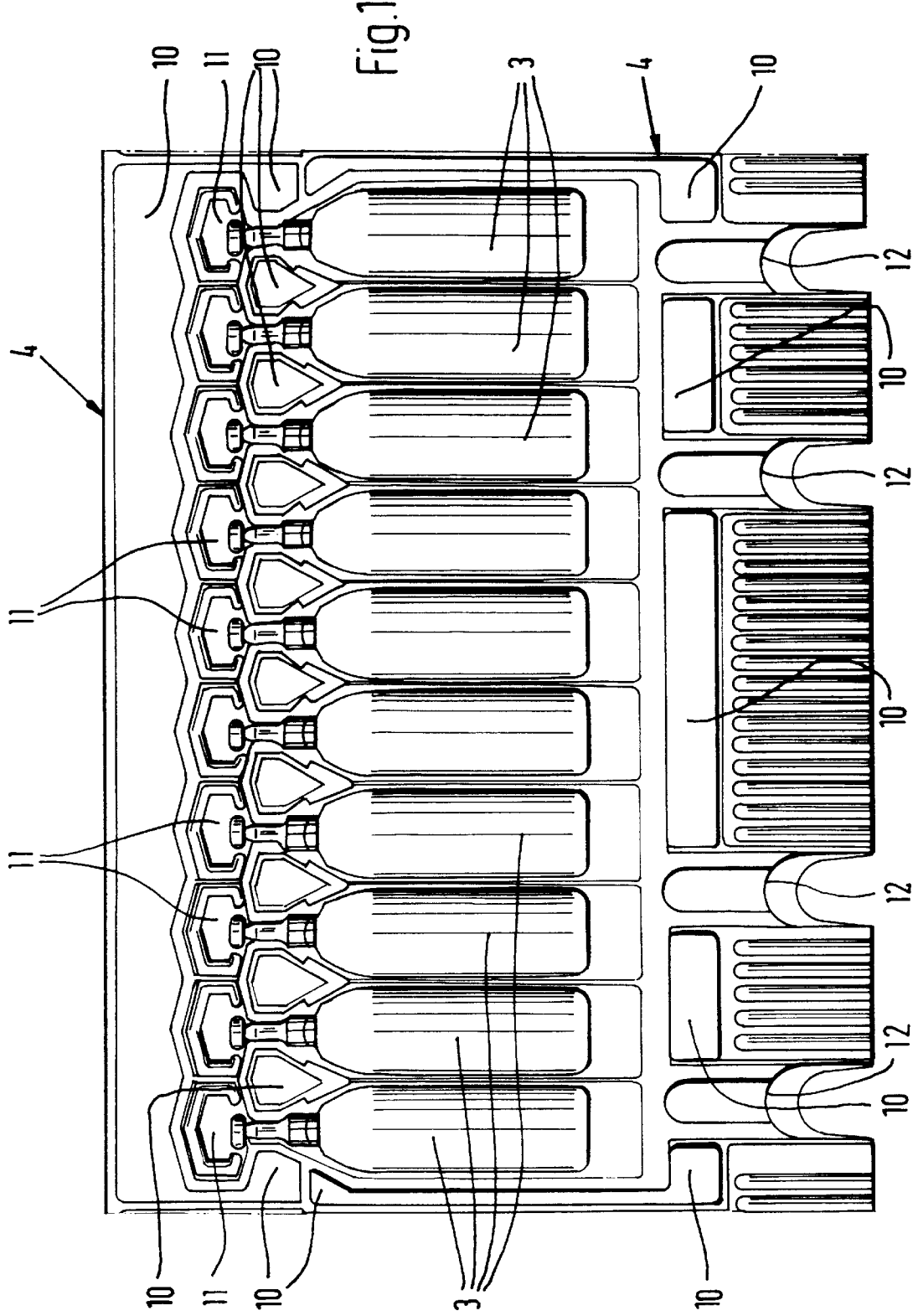

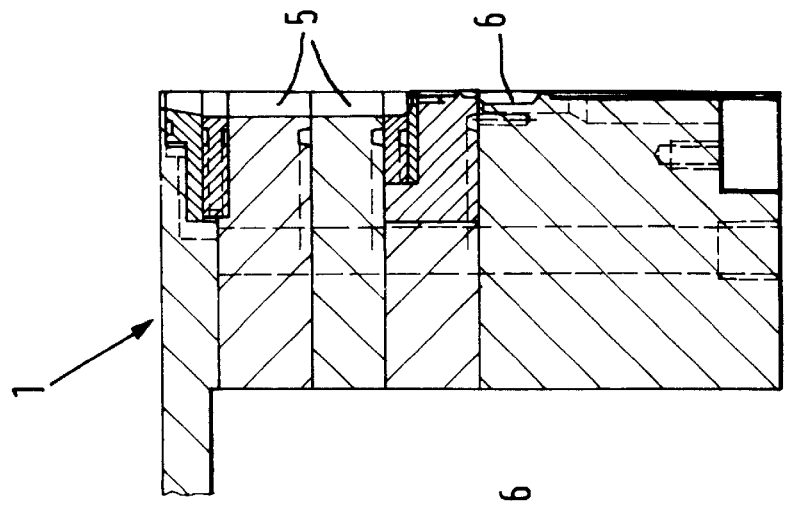
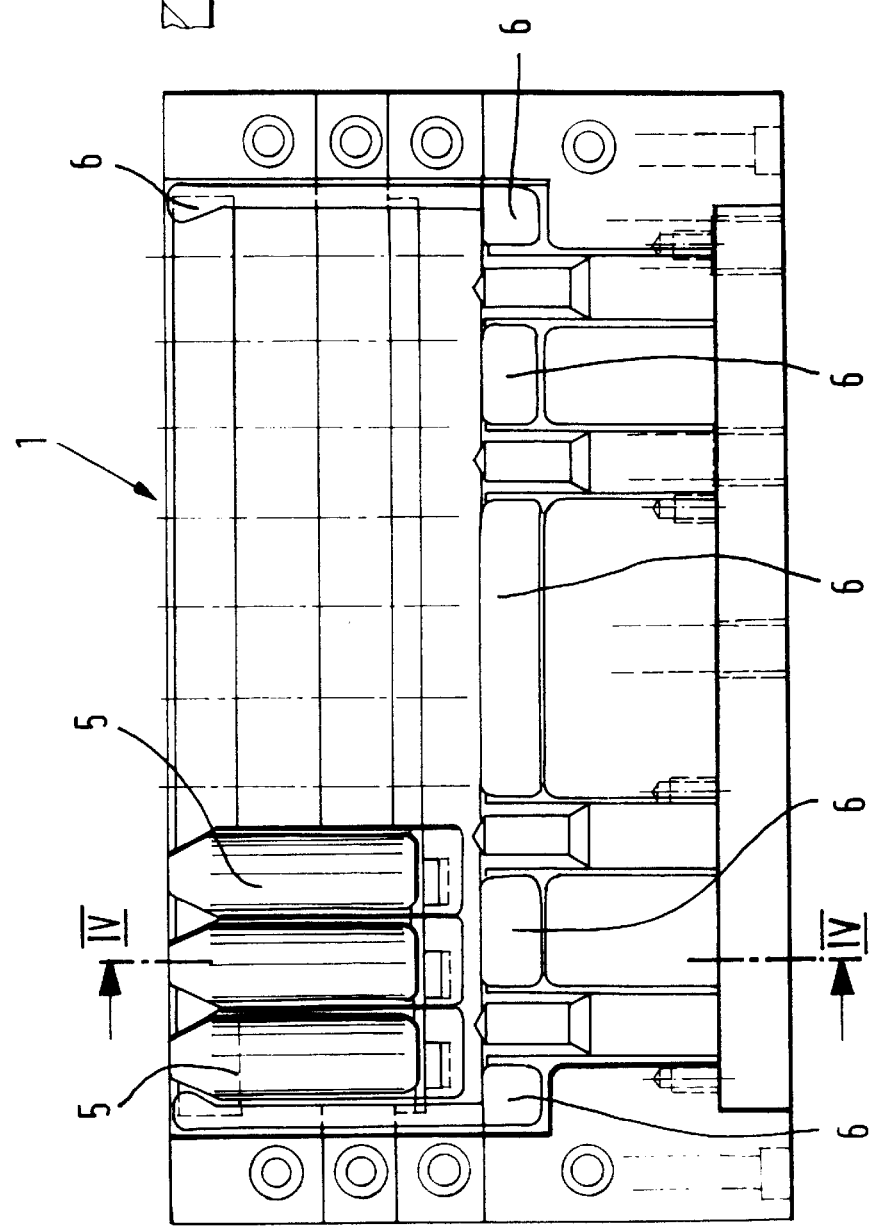

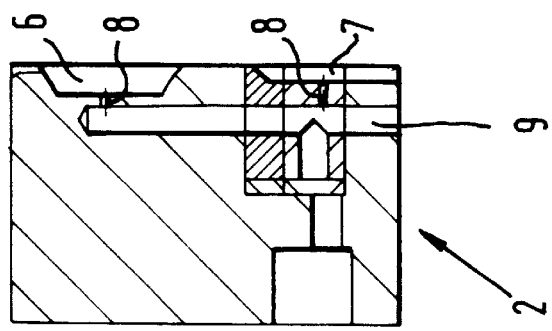
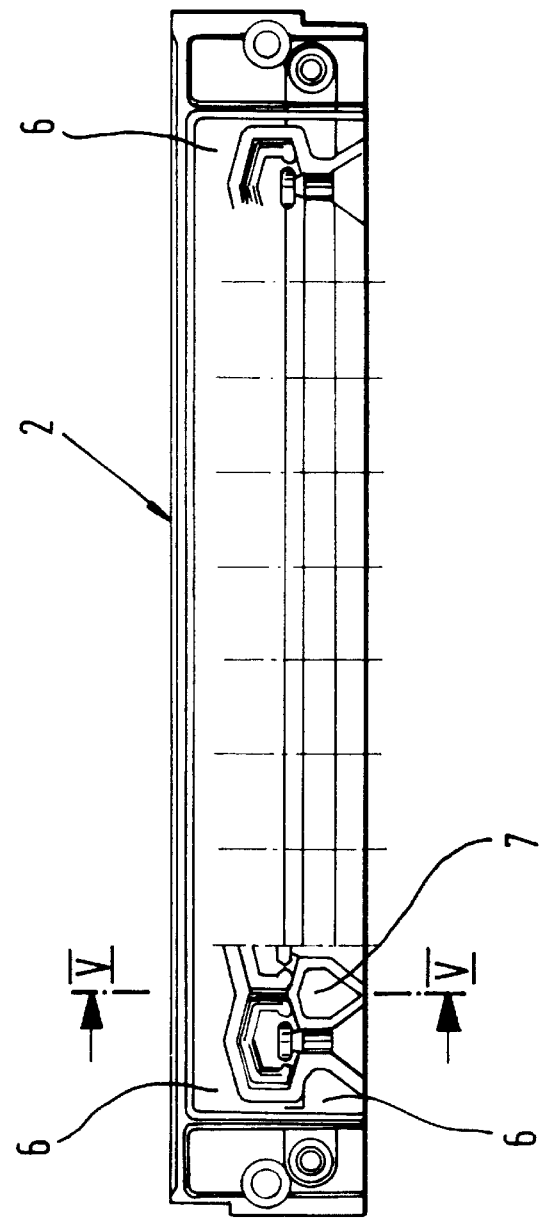

PROCESS FOR PRODUCING HOLLOW PLASTIC RECEPTACLES

This is a continuation of application Ser. No. 07/404,414 filed Sep. 8, 1989, now abandoned.

FIELD OF THE INVENTION

The present invention relates to a process for producing hollow plastic receptacles. Each half of the receptacle is formed from two portions of a starting material strip, preferably two portions of a tube, or the entire receptacle is formed from a tube. When two receptacle halves are formed, the halves are welded together to complete the receptacles. Outside of at least part of one of the seams, a marginal piece of waste zone or segment is formed with at least one hollow body.

BACKGROUND OF THE INVENTION

In the known method of forming hollow plastic receptacles by blow molding, a tube or hose is pressed together, as much as possible in the area of the margin of the receptacles for the purpose of cooling. In this margin, the pressure causes a fusion of the two layers. To decrease the closing forces of the molding tool required for this purpose, it was proposed to provide the margin with parallel ribs by means of corresponding recesses in the area of the molding tool forming the edge or marginal zone.

SUMMARY OF THE INVENTION

An object of the present invention is to provide a process for making hollow plastic receptacles where the formed receptacles are reinforced.

Another object of the present invention is to provide a process for making hollow plastic receptacles with at least one hollow body in a marginal area.

The foregoing objects are obtained by a process for producing hollow plastic receptacles, comprising the steps of: forming at least one hollow receptacle from a member of heat-sealable plastic, forming fused seams on marginal portions of the member to provide at least one marginal waste segment along the fused seams, and forming at least one hollow body in the marginal waste segment.

The shape and size of the hollow body or bodies can be adapted to whatever is required. Thus, it is generally advantageous to manufacture hollow bodies of different shapes and/or sizes.

If a plurality of adjacently arranged, flat or bottle-like receptacles (for instance, ampules), are produced simultaneously, and if each of the receptacles has a neck and/or head portion adjacent the body, then at least one hollow body can be formed from the area between two adjacent neck and/or head portions.

In order not to increase the cycle time by the formation of the hollow body or bodies, the formation and the fusion of each hollow body preferably occur simultaneously with the formation or fusion welding of the receptacle or receptacles.

Each receptacle produced can be filled following the fusion welding of both of its halves, if the halves are formed separately, and can be closed after filling in a second fusion welding operation.

Other objects, advantages and salient features of the present invention will become apparent from the following detailed description, which, taken in conjunction with the annexed drawings, discloses a preferred embodiment of the present invention.

Brief Description of the Drawings

Referring to the drawings which form a part of this disclosure:

FIG. 1 is a partial plan view of a block of ampules produced according to the method of the present invention, including its marginal portion or segment;

FIG. 2 is a partial plan view of the inside of one shell of the mold assembly for the production of the block of ampules of FIG. 1;

FIG. 3 is a partial plan view of the inside of one jaw of the mold assembly for forming and closing the heads of the block of ampules of FIG. 1;

FIG. 4 is a side elevational view in section along line IV—IV of FIG. 2; and FIG. 5 is an enlarged side elevational view in section along line V—V of FIG. 3.

Detailed Description of the Invention

The two halves of a mold assembly for use in practicing the process of the present invention are movable against and away from each other. The mold assembly comprises a left shell 1, a right shell of corresponding configuration, a left jaw 2 connected to the top end of the left shell 1, and a right jaw configured corresponding to the left jaw. An extruded plastic tube is introduced between the two halves of the mold. The dimensions of the plastic tube are selected so that, in the molding operation occurring by blow molding or by vacuum pressure, an ampule block is formed with a plurality of identical ampules 3 lying adjacent to one another from opposite areas or members of the plastic tube. Additionally, a waste margin segment, zone or hose 4 is formed surrounding this block.

During the closing of the two shells, the wall of the plastic tube is positioned in the recesses 5 to form the ampule receptacles in the shells. Sterile air is introduced by a blowpipe into each ampule body.

Following the formation of half portions of ampules 3, the two half portions or halves are welded together to form the ampules within the ampule block.

As shown in FIGS. 2 to 5, both of the shells as well as both of the jaws, in the area forming the marginal waste segments or zones 4, are provided with recesses 6 of different shapes and sizes. Another recess 7 is also provided in each segment lying between the neck portion and its respective and adjacent ampule 3. As shown in FIG. 5, a passage 8 opens into recesses 6 and 7. The passage can be connected through a collector passage 9 with a vacuum pressure source.

With the closing of the shells and the jaws, not only the ampules 3 are formed. With the end of recesses 6 and 7, hollow bodies 10 are also formed. This formation of the hollow bodies occurs simultaneously with the formation of ampules 3. As shown in FIG. 1, hollow bodies 10 are closed and form a framework surrounding the ampule block. By virtue of the hollow bodies 10, the ampule block has great stability or rigidity.

In the exemplary embodiment, before ampules 3 are discharged from the mold assembly, they are filled and then are closed with the aid of the jaws. The jaws can be operated independently of the shells, and can simultaneously form a bar head 11 for simplified opening.

With the aid of pegs or pins engaging blind holes 12 of the piece of waste segment or zone 4, the ampule block and the piece of waste zone 4 surrounding it can be easily removed from the mold assembly. By virtue of the great stability of the structure of the ampule block, the piece of waste zone or segment 4 can be removed reliably without any problem, even when ampules 3 are not yet completely cooled and/or filled.

All of the information included in the above specification, as well as the features which can only be derived from the drawing, are to be considered as further component parts of the invention, even if they are not specifically emphasized and are not even especially mentioned in the claims.

While a particular embodiment has been chosen to illustrate the invention, it will be understood by those skilled in the art that various changes and modifications can be made therein without departing from the scope of the invention as defined in the appended claims.

What is claimed is:

1. A process for producing hollow plastic receptacles, comprising the steps of:

simultaneously forming a group of hollow receptacles from a tubular member of heat-sealable plastic in a single mold such that the hollow receptacles are positioned side by side and each receptacle is formed in two halves which are welded together;

forming fused seams on marginal portions of the member to provide at least one marginal waste segment along with fused seams;

forming at least one closed hollow body simultaneously with and similarly to the receptacles in the marginal waste segment spaced from and attached to the hollow receptacles by the fused seams, and shaping the at least one hollow body to form a frame surrounding the group of hollow receptacles; and removing the group of hollow receptacles and the hollow body joined thereto from the mold;

whereby the receptacles and hollow body form a relatively stable and rigid article which can be reliably removed even before complete cooling of the article.

2. A process according to claim 1 wherein a plurality of hollow bodies are formed.

3. A process according to claim 2 wherein the hollow bodies are formed with different sizes.

4. A process according to claim 2 wherein the hollow bodies are formed with different shapes.

5. A process according to claim 1 wherein a plurality of bottle-like receptacles are simultaneously produced adjacent to one another with head portions tapering from bodies of the receptacles; and at least one additional hollow body is formed between the head portions of two adjacent receptacles.

6. A process according to claim 1 wherein the hollow body and each fused seam defining the hollow body is formed simultaneously from the member of heat-sealable plastic with the hollow receptacles.

7. A process according to claim 1 wherein each receptacle is filled following a first fusion welding of two receptacle halves to form the receptacle, and is subsequently closed in a second fusion welding.

8. A process according to claim 1 wherein the hollow body and the receptacle are formed by blow molding.

9. A process according to claim 5 wherein the plurality of bottle-like receptacles have ends and tapered sides on the head portions; and the additional hollow body is formed between the tapered sides of the head portions of two adjacent receptacles.

10. A process for producing a block of hollow receptacles and hollow bodies, comprising the steps of:

joining two plastic members in a facing relationship at selected points by fused seams and simultaneously and similarly forming hollow receptacles and closed hollow bodies which are joined adjacent to and separated from each other by the fused seams, the hollow bodies being formed in marginal waste segments and being shaped to form a frame surrounding the hollow receptacles, filling the hollow receptacles with contents, sealing the receptacles after filling, and removing the block of receptacles and bodies from the mold;

whereby the closed hollow bodies stabilize the receptacles in the block such that the block can be reliably removed from a mold even before complete cooling of the block.

11. A process according to claim 10 wherein the two plastic members form tube.

12. A process according to claim 10 wherein at least one of the closed hollow bodies is disposed between two of the receptacles in the block.

13. A process for producing hollow plastic receptacles, comprising the steps of:

simultaneously forming a group of hollow receptacles from a tubular member of heat-sealable plastic in a single mold such that the hollow receptacles are positioned side by side and each receptacle is formed in two halves which are welded together;

forming fused seams on marginal portions of the member to provide at least one marginal waste segment along with fused seams;

forming at least one hollow body simultaneously with and similarly to the receptacles in the marginal waste segment spaced from and attached to the hollow receptacles by the fused seams, and shaping the at least one hollow body to form a frame surrounding the group of hollow receptacles; and removing the group of hollow receptacles and the hollow body joined thereto from the mold;

whereby the receptacles and hollow body form a relatively stable and rigid article which can be reliably removed even before complete cooling of the article.

14. A process according to claim 13 wherein a plurality of hollow bodies are formed.

15. A process according to claim 14 wherein the hollow bodies are formed with different sizes.

16. A process according to claim 14 wherein the hollow bodies are formed with different shapes.

17. A process according to claim 13 wherein a plurality of bottle-like receptacles are simultaneously produced adjacent to one another with head portions tapering from bodies of the receptacles; and at least one additional hollow body is formed between the head portions of two adjacent receptacles.

18. A process according to claim 13 wherein the hollow body and each fused seam defining the hollow body is formed simultaneously from the member of heat-resealable plastic with the hollow receptacles.

19. A process according to claim 13 wherein each receptacle is filled following a first fusion welding of two receptacle halves to form the receptacle, and is subsequently closed in a second fusion welding.

20. A process according to claim 13 wherein the hollow body and the receptacles are formed by blow molding.

21. A process for producing a block of hollow receptacles and hollow bodies, comprising the steps of:

joining two plastic members in a facing relationship at selected points by fused seams and simultaneously and similarly forming hollow receptacles and hollow bodies which are joined adjacent to and separated from each other by the fused seams, the hollow bodies being formed in marginal waste segments and being shaped to form a frame surrounding the hollow receptacles, filling the hollow receptacles with contents, sealing the receptacles after filling, and removing the block of receptacles and bodies from the mold;

whereby the hollow bodies stabilize the receptacles in the block such that the block can be reliably removed from a mold even before complete cooling of the block.

22. A process according to claim 1 wherein a plurality of separate and spaced hollow bodies are formed and shaped to form the frames.

23. A process according to claim 1 wherein the frame is formed to extend substantially completely about four sides of the group of hollow receptacles.

24. A process according to claim 10 wherein a plurality of separate and spaced hollow bodies are formed and shaped to form the frame.

25. A process according to claim 10 wherein the frame is formed to extend substantially completely about four sides of the group of hollow receptacles.

26. A process according to claim 13 wherein a plurality of separate and spaced hollow bodies are formed and shaped to form the frame.

27. A process according to claim 13 wherein the frame is formed to extend substantially completely about four sides of the group of hollow receptacles.

28. A process according to claims 21 wherein a plurality of separate and spaced hollow bodies are formed and shaped to form the frame.

29. A process according to claim 21 wherein the frame is formed to extend substantially completely about four sides of the group of hollow receptacles.

30. A process according to claim 13 wherein the hollow body is formed and shaped to form the frame by vacuum forming.

* * * * *